United States Patent Office 3,551,562
Patented Dec. 29, 1970

3,551,562
INSECTICIDAL USE OF S-((4-OXO-1,2,3-BENZO-TRIAZIN - 3(4H)-YL) - METHYL) PHOSPHOROTHIOATES AND PHOSPHORODITHIOATES
Raymond H. Rigterink, Midland, Mich., assignor to The Dow Chemical Company, Midland, Mich., a corporation of Delaware
No Drawing. Original application May 5, 1967, Ser. No. 636,581, now Patent No. 3,502,670, dated Mar. 24, 1970. Divided and this application July 25, 1969, Ser. No. 870,984
Int. Cl. A01n 9/22
U.S. Cl. 424—200
22 Claims

ABSTRACT OF THE DISCLOSURE

The present invention is directed to S-((4-oxo-1,2,3-benzotriazin - 3(4H) - yl)methyl) phosphorothioates and phosphorodithioates of the formula

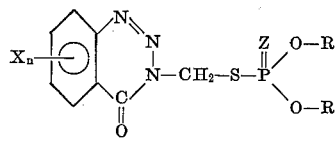

and to methods employing and compositions comprising these phosphorothioates and phosphorodithioates for controlling parasites, especially arthropod pests such as insects and arachnids. In the above and succeeding formulae in the present specification and claims, Z represents oxygen or sulfur; each X independently represents bromo or chloro; each R independently represents lower alkyl; and $n$ represents an integer of from 1 to 4, both inclusive.

The present invention is also directed to starting materials useful in the preparation of the above described phosphorothioates and phosphorodithioates. These starting materials are of the following formula:

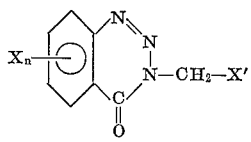

wherein X' represents bromo, chloro, or iodo.

DETAILED DESCRIPTION OF THE INVENTION

This application is a division of application Ser. No. 636,581 filed May 5, 1967, now U.S. Pat. No. 3,502,670.

As set forth above, the present invention is directed to compounds of the formula

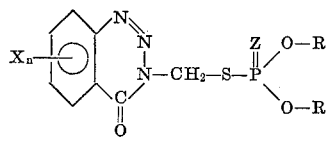

and to methods employing and compositions comprising these compounds for controlling arthropod pests such as insects and arachnids. In the above and succeeding formulae in the present specification and claims, Z represents oxygen or sulfur; each X independently represents bromo or chloro; each R independently represents lower alkyl; and $n$ represents an integer of from 1 to 4, both inclusive.

The term "lower alkyl" is employed in the present specification and claims to designate alkyl radicals being of from 1 to 4, both inclusive, carbon atoms.

Typically, the compounds of the present invention are crystalline solids, although some are viscous liquids. The compounds are somewhat soluble in many common organic solvents and of very low solubility in water. The compounds are useful as parasiticides and are especially adapted to be employed as active toxicants in compositions for the control, and, in particular, for the selective control, of a number of arthropod pest organisms such as cockroaches, beetles, mites, ticks, worms, Southern armyworms, aphids, flies, mosquitoes, cattle grubs, screw worms, and plum curculio.

The products of the present invention are prepared by reacting a phosphorothioic or phosphorodithioic acid having the formula

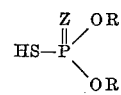

with a (halomethyl)benzotriazinone compound of the formula

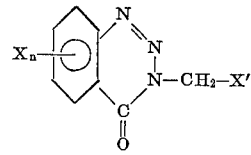

in the presence of a base, such as an alkali metal or ammonium carbonate or an alkali metal or ammonium hydroxide. In the above and succeeding formulae, X' is employed to designate bromo, chloro, or iodo. Alternately, the (halomethyl)benzotriazinone is reacted with an alkali metal or ammonium salt of the phosphorothioic or phosphorodithioic acid.

The reaction conveniently is carried out in an inert organic liquid such as acetone, dimethylformamide, acetonitrile, carbon tetrachloride, chloroform, benzene, toluene, ethyl methyl ketone, isobutyl methyl ketone, methanol, ethyl acetate, or methylene dichloride. The amounts of the reactants to be employed are not critical, some of the desired product being obtained when employing the reactants in any amounts. In the preferred method of operation, good results are obtained when employing substantially equimolecular proportions of the (halomethyl) benzotriazinone, phosphorothioic or phosphorodithioic acid, and the base; or when employing substantially equimolecular proportions of (halomethyl)benzotriazinone and phosphorothioate or phosphorodithioate salt. The reaction takes place smoothly at temperatures of from 0° to 125° C., but is preferably carried at temperatures of from 20 to 65° C. The reaction results in the production of the desired product, and an alkali metal or ammonium chloride byproduct.

In carrying out the reaction, the reactants or reactants and base are mixed and contacted together, conveniently in a reaction medium, and the resulting reaction mixture maintained for a period of time in the reaction temperature range to complete the reaction. Following the completion of the reaction, the reaction mixture is washed with water to remove the byproduct and organic liquid reaction medium removed by conventional procedures, typically, evaporation under subatmospheric pressure, to obtain the desired product as a residue. This product residue can be further purified by conventional procedures such as washing with water and dilute aqueous alkali metal hydroxide, solvent extraction, and recrystallization.

The desirable properties of the present products are inherent in the pure compounds; and when highly selective properties are to be relied upon, the purified compounds will be preferred. However, for many applications, wherein low cost is a major consideration, the reaction mixture wherein the product was prepared can be used with no steps whatsoever of separating or purifying product compounds. Likewise, incompletely purified products can be used, when desired.

A preferred embodiment of the present invention consists of those subject compounds of the formula

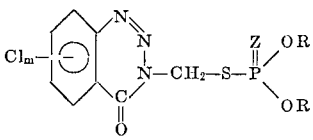

wherein m represents one or two. A yet more preferred sub-group of the subject compounds are those of the formula

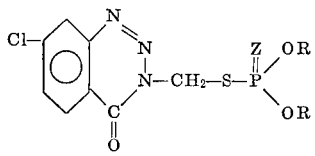

The compounds of these preferred sub-groups admit of ready synthesis and exhibit an excellent combination of the properties possessed by the subject compounds generally.

The following examples illustrate the best mode now known by the inventor for practicing the present invention and will enable those skilled in the art to practice the same.

EXAMPLE 1

S-((7-chloro-4-oxo-1,2,3-benzotriazin - 3(4H)-yl)methyl) O,O-diethyl phosphorodithioate O,O-diethyl phosphorodithioic acid (62.7 grams; 0.337 mole) was dissolved in 250 milliliters of acetone and 2.5 milliliters of water; subsequently, sodium bicarbonate (39.1 grams; 0.465 mole) was added with stirring. Thereafter, 7-chloro - 3 - (chloromethyl)-1,2,3-benzotriazin-4 (3H)-one (58.5 grams; 0.25 mole) was added, similarly with stirring, and the resulting reaction mixture heated to reflux temperature and maintained thereat for a period of one hour. The reaction mixture was then permitted to cool and 250 milliliters of benzene and 500 milliliters of water added with stirring. The organic layer was removed, washed three times with 100 milliliter portions of water, and solvent removed from the washed organic layer by evaporation under subatmospheric pressure. As a result of these operations, the desired S-((7-chloro-4-oxo-1,2,3-benzotriazin - 3(4H) - yl)methyl) O,O-diethyl phosphorodithioate product was obtained as a crystalline substance; it was recrystallized from 100 milliliters of methanol and the recrystallized material melted at 64–65° C. Elemental analysis was made and showed 11.1 percent nitrogen (theoretical, 11.1 percent); 9.5 percent chlorine (theoretical, 9.4 percent); and 16.9 percent sulfur (theoretical, 16.9 percent).

EXAMPLE 2

S-((7-chloro - 4 - oxo-1,2,3-benzotriazin-3(4H)-yl)methyl) O,O-diethyl phosphorodithioate 635 grams of O,O-diethyl phosphorodithioate (3.42 moles) were mixed with 1.5 liters of acetone. Thereafter, 274 grams of a 50 percent aqueous sodium hydroxide solution (representing 3.42 moles of sodium hydroxide) were added portionwise to the mixture. Following the addition, carried out at room temperature, the temperature of the reaction mixture rose to about 31° C., and the reaction mixture was cooled. Thereafter, 655 grams of 7-chloro-3-(chloromethyl) - 1,2,3 - benzotriazin-4(3H)-one (2.85 moles) were added portionwise to the mixture. Following the completion of the addition, the resulting reaction mixture was heated to a temperature of 55–60° C. and held at that temperature for about two hours. The reaction mixture was then permitted to cool and 1.5 liters of benzene and 1.0 liter of water added. The aqueous layer was separated and extracted with an additional 500 milliliters of benzene. Both organic portions were combined and washed with water and solvent removed by evaporation under subatmospheric pressure, resulting in a liquid residue. A liter of methanol was added to the residue to precipitate the desired S-((7-chloro-4-oxo-1,2,3-benzotriazin-3(4H) - yl)methyl) O,O-diethyl phosphorodithioate product, which was subsequently separated by filtration under subatmospheric pressure. Three crops were obtained, the first, melting at 64.5–65.5° C., judged to be the most pure; the three crops represented a total yield of 80.2 percent.

EXAMPLE 3

S-((7-chloro-4-oxo-1,2,3-benzothiazin - 3(4H) - yl)methyl) O,O-dimethyl phosphorodithioate Ammonium O,O-dimethyl phosphorodithioate (840 grams; 4.8 moles) and 2 liters of methanol were mixed, and the mixture cooled to a temperature of about 15° C. Thereupon, 920 grams of 7-chloro-3-(chloromethyl)-1,2,3-benzotriazin-4(3H)-one (4.0 moles) were added portionwise to the mixture and the resulting reaction mixture held for several hours. Small amounts of 5 N sodium hydroxide were added periodically to correct slight acidity of the reaction mixture. Thereafter, 500 milliliters of methanol were added to the reaction mixture and, for convenience, held overnight, at room temperature and with stirring. Following this holding period, the reaction mixture was poured into 2 liters of ice water and filtered under subatmospheric pressure to obtain the desired S-((7-chloro-4-oxo-1,2,3-benzotriazin-3(4H)-yl-methyl) O,O-dimethyl phosphorodithioate product. The product was purified by washing with 1.5 liters of cold methanol; drying the washed product; mixing with about 4 liters of methanol and a small amount of activated charcoal and filtering hot; and cooling and filtering the mixture under subatmospheric pressure. The product melts at 79–80°

Other representative products of the present invention are prepared in accordance with the procedures reported in Example 1, using the respective corresponding (chloromethyl)benzotriazinone compound and phosphorothioic or phosphorodithioic acid as starting materials. These other representative products are identified in the following table. In this table, as well as throughout the present specification, the symbol "M.P." is used as an abbreviation of the term "melting point"; the symbol "M.W." is used as an abbreviation of the term "molecular weight"; and the symbol "dec." is used as an abbreviation of the term "decomposition."

EXAMPLES 4–37

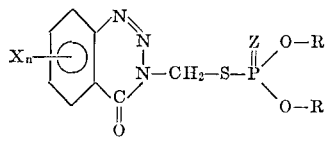

| Identity of compound | | | | Characterizing property |
|---|---|---|---|---|
| $X_n$ | Z | R | R | |
| 5-chloro | S | Methyl | Methyl | M.P., 99–101° C. |
| 8-chloro | S | Ethyl | Ethyl | M.P., 73–5° C. |
| 7-chloro | S | Isopropyl | Isopropyl | M.P., 77–9° C. |
| 5,6-dichloro | S | Ethyl | Ethyl | M.P., 100–1.5° C. |
| 6-chloro | S | Methyl | Methyl | M.P., 57–8.5° C. |
| 5,6,7-trichloro | S | Ethyl | Ethyl | M.P., 111–3° C. |
| 6-bromo | S | Methyl | Methyl | M.P., 70–2° C. |
| 7-chloro | S | Methyl | Isopropyl | M.W., 379.8. |
| 6-chloro | O | Ethyl | Ethyl | $n_D^{25}=1.5825$. |
| 6,8-dichloro | S | Methyl | Methyl | M.P., 102–4° C. |
| 6,7-dichloro | S | Methyl | Methyl | $n_D^{25}=1.5766$. |
| 5,6,7,8-tetrachloro | S | Ethyl | Ethyl | M.P., 142–4° C. |
| 6,8-dibromo | S | Methyl | Methyl | M.P., 132–4° C. |
| 5-chloro | S | Ethyl | Ethyl | M.P., 86–8° C. |
| 7-chloro | O | Ethyl | Ethyl | $n_D^{25}=1.5742$. |
| 5,7-dichloro | S | Ethyl | Ethyl | M.P., 86–7° C. |
| 6,8-dichloro | S | Isopropyl | Isopropyl | M.P., 55–7° C. |
| 6,7,8-trichloro | S | Ethyl | Ethyl | M.P., 85–7° C. |
| 6,7,8-tribromo | S | Methyl | Methyl | M.W., 554.1. |
| 6-chloro | S | Ethyl | Ethyl | M.P., 56–8° C. |
| 6,7,8-trichloro | S | Methyl | Methyl | M.P., 117–9° C. |
| 7-chloro | S | Methyl | Methyl | M.P., 79–80° C. |
| 6-bromo | S | Ethyl | Ethyl | M.P., 74–5.5° C. |
| 6,8-dichloro | O | Ethyl | Ethyl | M.P., 88–90° C. |
| 5,6,8-trichloro | S | Ethyl | Ethyl | M.P., 119–20° C. |
| 8-chloro | S | Methyl | Methyl | M.P., 110–2° C. |
| 8-chloro | O | n-Butyl | n-Butyl | M.W., 419.9. |
| 5,8-dichloro | S | Ethyl | Ethyl | M.P., 130–1° C. |
| 6,7-dichloro | S | Ethyl | Ethyl | M.P., 85–7° C. |
| 6,8-dichloro | S | Ethyl | Ethyl | M.P., 105–6.5° C. |
| 6,8-dichloro | S | Ethyl | Isobutyl | M.W., 442.3. |
| 7,8-dichloro | S | Ethyl | Ethyl | M.P., 90–2° C. |
| 6,8-dibromo | S | Ethyl | Ethyl | M.P., 130–2° C. |
| 6-bromo-8-chloro | S | Ethyl | Ethyl | M.W., 458.7. |

The compounds of the present invention are useful as parasiticides and parasite repellents in a variety of household, industrial, and agricultural operations. In particular, the compounds are useful for the kill and control of arthropod pest organisms, such as crustaceans, including sow bugs and fiddler crabs; arachnids, including spiders, mites, and ticks; myriapods, including centipedes; and insects. The compounds of the present invention can be employed to give a quick inactivation of such organisms; this is spoken of as a "quick (or good) knockdown." Because of this, the subject compounds are particularly suitable for the control, inside houses, barns, warehouses, public buildings, and the like, of arthropod pests, including cockroaches, such as the German cockroach, American cockroach, and brown-banded cockroach; beetles, such as the black-carpet beetle, confused flour beetle, saw-tooth grain beetle, and larder beetle; spiders; silverfish; bedbugs; fleas, such as those on bedding used by household pets, and flea larvae; mosquitos; box-elder bugs; spiders; mites; ants; centipedes; and flies, such as the common housefly. The subject compounds exhibit negligible mammalian toxicity at rates which are highly effective for such indoor control of arthropod pests and thus are particularly adapted for such employment.

The compounds of the present invention are also very effective for the control of the many arthropod organisms found on the roots or aerial portions of growing plants, including aphids, mites, plant pathogens, and chewing and sucking insects, such as Southern armyworm (*Prodenia eridania*), California red scale (*Aonidiella aurantii*), boll weevil, coddling moth, Mexican bean beetle (*Epilachna varivestis*), two-spotted spider mite (*Tetranychus bimaculatus*), and bean aphid (*Aphis fabae*).

Furthermore, the subject compounds, when applied to plants, plant parts and their habitats to protect the plants from the attack of arthropod organisms, exhibit residual and extended control of the organisms. Such extended control assures better protection of the plants against destructive organisms with a minimum number of applications of the active agent.

The compounds of the present invention are also useful to control parasites which attack the exterior of animals, the so-called external parasites such as ticks, flies, grubs, and the like. In this application, the compounds can be applied directly onto the parasites; alternately, contact of these parasites with the compounds can be achieved by administering the compound to susceptible host animals. In this alternate mode of application, the compounds are systemic and thereby effect a control of candidate external parasites.

The new compounds can also be included in inks, adhesives, soaps, polymeric materials, cutting oils or in oil or latex paints. Also, the present compounds can be distributed in textiles, cellulosic materials, or in grains, or can be employed in the impregnation of wood and lumber. In yet other procedures, the compounds of the present invention can be vaporized or sprayed or distributed as aerosols into the air, or onto surfaces in contact with the air. In such applications, the compounds manifest the useful properties hereinbefore described.

In all applications, of which the foregoing are merely representative, the products of the present invention are distinguished by a broader spectrum of species against which they are effective; by longer residual effectiveness; and by greater safety, due to low mammalian toxicity.

The methods of the present invention comprise contacting an arthropod with an inactivating amount of one of the present compounds. Contacting can be effected by application of the compound to habitat of arthropods. Representative habitats include soil, air, water, food, vegetation, inert objects, stored matter such as grains, other animal organisms, and the like. The inactivation can be lethal, immediately, or with delay, or can be a sub-lethal one in which the inactivated arthropod is not able to carry out one or more of its normal life processes. This latter situation prevails when one of the systems of the arthropod, typically the nervous system, is seriously disturbed. A preferred embodiment of the present invention comprises the employment of the present method for the kill and control of insects and arachnids.

The inactivation of an arthropod by the application of an inactivating amount of one of the present compounds is critical to the method of the present invention. The compound can sometimes be employed in unmodified form. Frequently, however, the desirable properties of such compound can be utilized only when the compound is modified by the employment with it of a pesticidal adjuvant. Thus, for example, the present compounds are of very low solubility in water but are relatively soluble in oils, including plant essential oils. Accordingly, the application of the pure compound, even by the use of highly sophisticated techniques, to the surface of a plant commonly results in its dispersion and loss in surface waxes or essential oils; or, in the common situation of early morning application when the plant is wet with dew, may result in run-off which leaves the plant with little or no applied product. Also, in aquatic settings, the desirable properties of the compounds can usually be utilized only when the compounds are modified by the employment of a pesticidal adjuvant. Moreover, the pure compound is attacked in outdoor situations by sunlight and air, whereas, incorporated in a pesticidal adjuvant the compound often derives protection from such influences. Therefore, the practical enjoyment of the beneficial utilities of the present compounds often requires that the compound be composited with one or more pesticidal adjuvant substances, and the resulting compositions are comprehended within the present invention.

The composition can be a liquid or a dust; and the adjuvant employed can be any one or a plurality of materials including aromatic solvents, petroleum distillates, water, or other liquid carriers, propellant substances, surface-active dispersing agents, light absorbers, and finely divided carrier solids. In such compositions, the adjuvant cooperates with the subject compound so as to obtain a composition to facilitate the method of the present invention, and to obtain an improved result. The use of either a surface-active dispersing agent or a finely divided carrier solid and the use of both a surface-active dispersing agent and a finely divided carrier solid, simultaneously, constitute preferred embodiments of the method of the present invention. Another preferred embodiment of the present invention is a composition comprising one or more of the subject compounds, an organic liquid as a solvent and carrier therefor, and a propellant material. Numerous other embodiments will become available to those skilled in the art in view of the teachings set forth hereinbelow.

The exact concentration of one or more of the subject compounds in a composition thereof with one or a plurality of adjuvants can vary; it is necessary only that one or more of the compounds be present in such amount as to make possible the application of an inactivating dosage. In many situations, a composition comprising .0001 percent of one, or a total of more than one, of the subject compounds is effective for the administration of an inactivating amount thereof to arthropod pest organisms. In other procedures, compositions comprising a lesser amount, such as .00001 percent of one, or more than one, of the subject compounds, or a greater amount, such as 0.05 percent or more of one, or more than one, of the subject compounds, are effective for the inactivation of arthropod organisms. In still other operations, compositions containing from 0.5 to 98 percent by weight of a subject compound, or from 0.5 to 98 percent of a total of more than one subject compound, are conveniently employed. In such compositions, preferred adjuvants are a surface-active agent or a finely divided carrier solid. Such compositions are adapted to be employed as treating compositions and applied to parasites and to their habitats, or to be employed as concentrates and subsequently diluted with additional adjuvant to produce ultimate treating compositions.

When combining the present toxicants with adhesives, detergents, cutting oils, paints, polymeric materials, textiles, paper, and other similar products, good results are obtained when the compounds are incorporated in such products in the amount of at least 0.01 percent by weight, and when heavier applications are needed in the amount of from 0.1 to 2.0 percent by weight. When one or more than one of the present toxicants is combined with wood, excellent results are obtained when the toxicant compound or compounds are incorporated by conventional treatment of the wood in the amount of from 0.0001 to 0.05 pound or more per cubic foot of wood, depending on depth of penetration, exposure, and the like.

In the preparation of dust compositions, the subject compounds can be compounded with any of the finely divided carrier solids such as pyrophyllite, diatomaceous earth, gypsum and the like. In such operations, the finely divided carrier is ground or mixed with one or more of the compounds, an active agent, or wetted with a solution of the active agent in a volatile organic solvent. Similarly, dust compositions containing a subject compound can be similarly compounded from various of the solid dispersing agents, such as fuller's earth, attapulgite and other clays. These dust compositions can be employed as treating compositions or can be employed as concentrates and subsequently diluted with additional solid dispersing agent or with pyrophyllite, diatomaceous earth, gypsum and the like to obtain the desired amount of active agent in a treating composition. Also, such dust compositions can be dispersed in water, with or without the aid of surfactant, to form spray mixtures.

Further, one of the subject compounds or a dust concentrate composition containing such compound can be incorporated in intimate mixture with surface active dispersing agents such as ionic and nonionic emulsifyng agents to form spray concentrates. Such concentrates are readily dispersible in liquid carriers to form sprays containing the toxicant in any desired amount. The choice of dispersing agent and amount thereof employed are determined by the ability of the agent to facilitate the dispersion of the concentrate in the liquid carrier to produce the desired spray composition.

In the preparation of liquid compositions, the subject compound can be compounded with a suitable water-immiscible organic liquid and surface active dispersing agent to produce an emulsifiable liquid concentrate which can be further diluted with water and oil to form spray mixtures in the form of oil-in-water emulsions. In such compositions, the carrier comprises an aqueous emulsion, that is, a mixture of water-immiscible solvent, emulsifying agent and water. Preferred dispersing agents to be employed in these compositions are oil-soluble and include the non-ionic emulsifiers such as the polyoxyethylene derivatives of sorbitan esters, complex ether alcohols and the like. However, oil-soluble ionic emulsifying agents such as mahogany soaps can also be used. Suitable organic liquids to be employed in the compositions include petroleum oils and distillates, toluene, liquid halohydrocarbons and synthetic organic oils.

When operating in accordance with the present invention, the subject compound or a composition containing the compound is applied to the pests to be controlled directly, or by means of application to a portion or portions of their habitat in any convenient manner, for example, by means of hand dusters or sprayers or by simple mixing with the food to be ingested by the organisms. Application to the foliage of plants is conveniently carried out with power dusters, boom sprayers and fog sprayers. In such foliar applications, the employed compositions should not contain any appreciable amounts of any phytotoxic diluents. In large scale operations, dusts, or low-volume sprays can be applied from an airplane. The present invention also comprehends the employment of compositions comprising one of the subject compounds, an adjuvant, and one or more other biologically active materials, such as insecticides, fungicides, miticides, bactericides, nematocides, and the like, or one or more synergistic materials.

A preferred and especially convenient manner for the application of one or more of the present products comprises the use of a self-pressurized pack formulation which can be used, for example, as a space or surface spray. Such a formulation can comprise one or more of the present compounds, an organic liquid as a solvent and vehicle therefor, and a propellant material which can be a condensed and compressed gas or a substance which, at room temperature, is a gas under atmospheric pressure but which liquefies under superatmospheric pressure. Where the propellant material is of the latter type, the self-pressurized pack formulation is often spoken of as an aerosol. Representative propellants include propane, butane, nitrogen, and the fluorinated hydrocarbons, such as dichlorodifluoromethane and trichlorofluoromethane. Generally, the propellant constitutes from 25 to 95 percent by weight of the total self-pressurized pack. As vehicle, there can be employed any liquid in which the desired amount of product is capable of being dispersed; preferred vehicles include petroleum distillates, kerosene, and methylene chloride. The self-pressurized pack formulation can also include other materials, such as other biologically active agents or synergists. For further discussion of the use of self-pressurized pack formulations, see U.S. Pats. 1,892,-750 and 2,321,023.

The control of pest organisms by the contacting thereof with one or more of the subject compounds is illustrated by the following examples.

EXAMPLE 38

Aqueous compositions, each containing one of the present compounds, are prepared as follows:

4 parts by weight of one of the subject compounds, 0.08 part of sorbitan trioleate and 0.02 part of a sorbitan monolaurate polyoxyethylene derivative are dispersed in 40 milliliters of acetone to produce a concentrate composition in the form of a water-dispersible liquid. This concentrate composition is dispersed in water to provide aqueous compositions containing varying amounts of the subject compound employed.

In this manner, aqueous compositions are separately prepared with each of

S-((7-chloro-4-oxo-1,2,3-benzotriazin-3(4H)-yl)methyl) O,O-diethyl phosphorodithioate;
S-((5-chloro-4-oxo-1,2,3-benzotriazin-3(4H)-yl)methyl) O,O-dimethyl phosphorodithioate;
S-((8-chloro-4-oxo-1,2,3-benzotriazin-3(4H)-yl)methyl) O,O-diethyl phosphorodithioate;
S-((7-chloro-4-oxo-1,2,3-benzotriazin-3(4H)-yl)methyl) O,O-diisopropyl phosphorodithioate;
S-((5,6-dichloro-4-oxo-1,2,3-benzotriazin-3(4H)-yl)- methyl) O,O-diethylphosphorodithioate;
S-((6-chloro-4-oxo-1,2,3-benzotriazin-3(4H)-yl)methyl) O,O-dimethyl phosphorodithioate;
S-((5,6,7-trichloro-4-oxo-1,2,3-benzotriazin-3(4H)-yl)- methyl) O,O-diethyl phosphorodithioate;
S-((6-bromo-4-oxo-1,2,3-benzotriazin-3(4H)-yl)-methyl) O,O-dimethyl phosphorodithioate;
S-((7-chloro-4-oxo-1,2,3-benzotriazin-3(4H)-yl)methyl) O-methyl O-isopropyl phosphorodithioate;
S-((6-chloro-4-oxo-1,2,3-benzotriazin-3(4H)-yl)methyl) O,O-diethyl phosphorothioate;
S-((6,8-dichloro-4-oxo-1,2,3-benzotriazin-3(4H)-yl)- methyl) O,O-dimethyl phosphorodithioate;
S-((6,7-dichloro-4-oxo-1,2,3-benzotriazin-3(4H)-yl)- methyl) O,O-dimethyl phosphorodithioate;
S-((5,6,7,8-tetrachloro-4-oxo-1,2,3-benzotriazin-3(4H)- yl)methyl) O,O-diethyl phosphorodithioate;
S-((6,8-dibromo-4-oxo-1,2,3-benzotriazin-3(4H)-yl)- methyl) O,O-dimethyl phosphorodithioate;
S-((5-chloro-4-oxo-1,2,3-benzotriazin-3(4H)-yl)methyl) O,O-diethyl phosphorodithioate;
S-((7-chloro-4-oxo-1,2,3-benzotriazin-3(4H)-yl)methyl) O,O-diethyl phosphorothioate;
S-((5,7-dichloro-4-oxo-1,2,3-benzotriazin-3(4H)-yl)- methyl) O,O-diethyl phosphorodithioate;
S-((6,8-dichloro-4-oxo-1,2,3-benzotriazin-3(4H)-yl)- methyl) O,O-diisopropyl phosphorodithioate;
S-((6,7,8-trichloro-4-oxo-1,2,3-benzotriazin-3(4H)-yl)- methyl) O,O-diethyl phosphorodithioate;
S-((6,7,8-tribromo-4-oxo-1,2,3-benzotriazin-3(4H)-yl)- methyl) O,O-dimethyl phosphorodithioate;
S-((6-chloro-4-oxo-1,2,3-benzotriazin-3(4H)-yl)methyl) O,O-diethyl phosphorodithioate;
S-((6,7,8-trichloro-4-oxo-1,2,3-benzotriazin-3(4H)-yl)- methyl) O,O-dimethyl phosphorodithioate;
S-((7-chloro-4-oxo-1,2,3-benzotriazin-3(4H)-yl)methyl) O,O-dimethyl phosphorodithioate;
S-((6-bromo-4-oxo-1,2,3-benzotriazin-3(4H)-yl)methyl) O,O-diethyl phosphorodithioate;
S-((6,8-dichloro-4-oxo-1,2,3-benzotriazin-3(4H)-yl)- methyl) O,O-diethyl phosphorothioate;
S-((5,6,8-trichloro-4-oxo-1,2,3-benzotriazin-3(4H)-yl)- methyl) O,O-diethyl phosphorodithioate;
S-((8-chloro-4-oxo-1,2,3-benzotriazin-3(4H)-yl)methyl) O,O-dimethyl phosphorodithioate;
S-((8-chloro-4-oxo-1,2,3-benzotriazin-3(4H)-yl)methyl) O,O-di-n-butyl phosphorothioate;
S-((5,8-dichloro-4-oxo-1,2,3-benzotriazin-3(4H)-yl)- methyl) O,O-diethyl phosphorodithioate;
S-((6,7-dichloro-4-oxo-1,2,3-benzotriazin-3(4H)-yl)- methyl) O,O-diethyl phosphorodithioate;
S-((6,8-dichloro-4-oxo-1,2,3-benzotriazin-3(4H)-yl)- methyl) O,O-diethyl phosphorodithioate;
S-((6,8-dichloro-4-oxo-1,2,3-benzotriazin-3(4H)-yl)- methyl) O-ethyl O-isobutyl phosphorodithioate;
S-((7,8-dichloro-4-oxo-1,2,3-benzotriazin-3(4H)-yl)- methyl) O,O-diethyl phosphorodithioate;
S-((6,8-dibromo-4-oxo-1,2,3-benzotriazin-3(4H)-yl)- methyl) O,O-diethyl phosphorodithioate; and
S-((6-bromo-8-chloro-4-oxo-1,2,3-benzotriazin-3(4H)- yl)methyl) O,O-diethyl phosphorodithioate.

EXAMPLE 39

In further operations, aqueous compositions, each containing one of the compounds of the present invention, are prepared as follows.

A known quantity of one of the subject compounds is mixed with a quantity of water, a quantity of an alkyl aryl sulfonate, and a quantity of a substituted benzoid alkyl sulphonic acid, and the resulting mixture ballmilled together to produce a composition containing 4000 parts by weight of the compound employed, 300 parts by weight of alkyl aryl sulfonate and 300 parts by weight of substituted benzoid alkyl sulphonic acid, per million parts of ultimate composition.

In this procedure, there are prepared aqueous compositions from each of the compounds identified in Example 38.

Compositions prepared according to these procedures of Example 39 can be employed as treating compositions or can be diluted with additional quantities of water to prepare aqueous treating compositions of lesser concentrations.

EXAMPLE 40

The compounds in accordance with the present invention can also be employed to prepare aerosol compositions which are particularly effective for localized control of pest organisms in and around houses, barns, warehouses, and the like.

In representative operations, an aerosol formulation containing 1 percent of one of the subject compounds, 51 percent of a petroleum distillate, and 48 percent of dichlorodifluoromethane is prepared by dispersing the subject compound in the petroleum distillate and placing the resulting dispersion and liquid dichlorodifluoromethane within a closed cylinder provided with an orifice, opening of which is controlled by a valve operable from the exterior of the cylinder. In this manner, aerosol formulations are prepared with each of the compounds identified in Example 38.

These compositions are particularly adapted to be employed as aerosol compositions for the control of crawling insects, such as roaches, silverfish, ants, spiders, and the like.

EXAMPLE 41

An aqueous treating composition containing 100 parts of S-((5-chloro-4-oxo-1,2,3-benzotriazin - 3(4H) - yl) methyl) O,O-dimethyl phosphorodithioate per million parts by weight of ultimate aqueous treating composition was prepared according to the procedures of the foregoing examples. This aqueous treating composition was employed for the control of Mexican bean beetles (*Epilachna varivestis*), in the third instar stage, on cranberry bean plants. The cranberry bean plants were wetted briefly with the aqueous treating composition, the wetted plants permitted to dry, and the dried plants placed within a confined area and caused to be infested with a known number of Mexican bean beetles. Thereafter, the infested plants were held under good agricultural conditions for a period of several days. At the end of this period, the cranberry bean plants were examined and there was found a complete kill of the Mexican bean beetles.

EXAMPLE 42

An aqueous treating composition containing 500 parts of S-((6,8-dichloro - 4 - oxo-1,2,3-benzotriazin-3(4H)-yl) methyl) O,O-diisopropyl phosphorodithioate per million parts by weight of ultimate aqueous treating composition was prepared. A quantity of fruit and a known number of plum curculio adults feeding thereon were wetted briefly with this aqueous treating composition; thereafter, the treated fruit and curculio adults were permitted to dry and held for about 6 days under conditions conducive to the growth and well-being of plum curculio adults. At the end of the 6 day period, the fruit was examined to determine the percent mortality of plum curculio adults, and it was found that there had been obtained a 100 percent kill and control of plum curculio adults.

EXAMPLE 43

An aqueous treating composition containing 500 parts of S-((7-chloro - 4 - oxo-1,2,3-benzotriazin-3(4H)-yl) methyl) O,O-diethyl phosphorothioate per million parts by weight of ultimate aqueous treating composition was prepared according to the procedures of Example 38. Houseflies (Musca domestica) were uniformly wetted briefly with this aqueous treating composition and thereafter observed for mortality for 72 hours. Treatment of the houseflies in this manner resulted in inactivation of in excess of 80 percent of the treated houseflies within the first two hours following treatment. Observation of the flies at the end of the 72 hour period showing a 96 percent kill of the flies.

EXAMPLE 44

Essentially the same results as in Example 43 were obtained when S-((6,8-dichloro-4-oxo-1,2,3-benzotriazin-3(4H)-yl)methyl) O,O-diethyl phosphorodithioate was employed in the procedures of Example 43, except that the percent of inactivation in the initial two hour period was slightly less, being between 50 and 80 percent.

EXAMPLES 45–52

Numerous compositions were prepared according to the procedures of Examples 38 and 39, each such composition containing 500 parts of one of the compounds of the present invention as sole toxicant per million parts by weight of ultimate treating composition. Stands of cranberry bean plants heavily infested with two-spotted spider mites in the egg and adult stages were separately wetted briefly with the treating compositions, the treated plants permitted to dry, and the treated and dried plants held under favorable agricultural conditions for a period of about 5 days. At the end of this period, the plants were examined to ascertain the percent kill and control of two-spotted spider mites in the adult stage; degree of control of two-spotted spider mites in the egg stage was also noted, and reported, where observed, as fair (0–50 percent), good (51–80 percent), or excellent (81–100 percent) ovicidal activity. The results of the evaluations are set forth in the following table.

| Subject compound | Percent kill and control of adult two-spotted spider mite | Ovicidal rating |
|---|---|---|
| S-((6-chloro-4-oxo-1,2,3-benzotriazin-3(4H)-yl)methyl) O,O-dimethyl phosphorodithioate | 100 | Fair. |
| S-((7-chloro-4-oxo-1,2,3-benzotriazin-3(4H)-yl)methyl) O,O-dimethyl phosphorodithioate | 95 | Fair. |
| S-((6-chloro-4-oxo-1,2,3-benzotriazin-3(4H)-yl)methyl) O,O-diethyl phosphorodithioate | 100 | Excellent. |
| S-((6-chloro-4-oxo-1,2,3-benzotriazin-3(4H)-yl)methyl) O,O-diethyl phosphorothioate | 100 | Excellent. |
| S-((7-chloro-4-oxo-1,2,3-benzotriazin-3(4H)-yl)methyl) O,O-diethyl phosphorodithioate | 100 | Excellent. |
| S-((7-chloro-4-oxo-1,2,3-benzotriazin-3(4H)-yl)methyl) O,O-diethyl phosphorothioate | 100 | Excellent. |
| S-((6,8-dichloro-4-oxo-1,2,3-benzotriazin-3(4H)-yl)methyl) O,O-diethyl phosphorodithioate | 96 | Fair. |
| S-((7,8-dichloro-4-oxo-1,2,3-benzotriazin-3(4H)-yl)methyl) O,O-diethyl phosphorodithioate | 90 | Fair. |

The (halomethyl)benzotriazinone compounds to be employed as starting materials in the preparation of the products of the present invention are themselves prepared by the reaction of the corresponding (hydroxymethyl)benzotriazinone compounds:

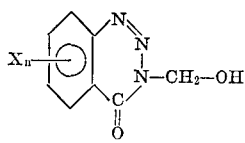

with a halogenating agent such as hydrochloric acid, hydrobromic acid, hydriodic acid, phosphorus pentachloride, phosphorus tribromide, or thionyl chloride. The reaction is conveniently carried out in an inert liquid reaction medium, such as, for example, hydrocarbons, chlorinated hydrocarbons, or ketones. The reaction consumes the reactants in amounts representing equimolecular proportions; but better yields are usually obtained by employing an excess of the halogenating agent, such as from one to ten molecular proportions of halogenating agent per molecular proportion of the (hydroxymethyl)benzotriazinone compound.

The reaction goes forward readily under a wide range of temperatures such as from 20° C. to the reflux temperature of the reaction medium. The reaction results in the preparation of the desired (halomethyl)benzotriazinone compound; by-products vary in accordance with the identity of the halogenating agent.

In carrying out the reaction, the reactants are contacted with one another in liquid reaction medium; the reaction goes forward almost immediately upon the contacting of the reactants, but higher yields are often obtained by maintaining the reaction mixture for a period of time following completion of the contacting of the reactants. By-products are removed in conventional procedures, leaving a reaction medium containing the desired (halomethyl)benzotriazinone starting material; it can be separated from the reaction medium, and, if desired, purified, in conventional procedures.

The (halomethyl)benzotriazinone compounds are useful as starting materials in the synthesis of the products of the present invention. They are also useful, themselves, as toxicants to control parasites such as insects and acarids.

The following examples illustrate the embodiment of the present invention in the (halomethyl)benzotriazinone compounds, and will enable those skilled in the art to practice the same.

EXAMPLE 53

7-chloro-3-(chloromethyl)-1,2,3-benzotriazin-4(3H)-one 7-chloro - 3 - (hydroxymethyl) - 1,2,3 - benzotriazin-4(3H)-one (197 grams; 0.93 mole) was suspended in 1000 milliliters of chloroform and thionyl chloride (566 grams; 4.66 moles) added portionwise over one-half hour with stirring. Gas was evolved and the 7-chloro-3-(hydroxymethyl)-1,2,3-benzotriazin-4(3H)-one dissolved. The solution was heated to reflux and refluxed with stirring for one hour. The solution was then cooled in an ice water bath and concentrated by vacuum distillation until a large mass of crystals, the desired 7-chloro-3-(chloromethyl)-1,2,3-benzotriazin-4(3H) - one product, had precipitated in the concentrate. 1000 milliliters of 95% ethanol were added portionwise to the concentrate, with cooling to maintain below 35° C. Solvent was removed by suction filtration to separate the product and the separated product washed with some cold ethanol and subsequently dried in an oven at about 60° C. The dried material (156.5 grams) was a light tan solid melting at 137–9° C. A second crop (18.5 grams, M.P. 120–7° C.) was obtained by concentration of the mother liquor (total yield of 82%). Elemental analysis of the first crop gave 18.2% nitrogen (theory=18.3% N) and 30.3% chlorine (theory=30.8% Cl).

EXAMPLE 54

7-chloro-3-(chloromethyl)-1,2,3-benzotriazin-4(3H)-one 7-chloro - 3 - (hydroxymethyl) - 1,2,3 - benzotriazin-4(3H)-one (17.7 grams; 0.1 mole) and 100 milliliters of acetone were mixed and hydrogen chloride bubbled into the mixture, at room temperature, until excess hydrogen chloride was present. The temperature of the reaction mixture began to rise spontaneously, and the reaction mixture was placed on an ice water bath. The reaction mixture was then held for 1½ hours with stirring and at room temperature. At the end of this period of time, the excess hydrogen chloride and most of the acetone were removed by evaporation under subatmospheric pressure. The residue was cooled in an ice water bath, mixed with 100 milliliters of water, cooled further in an ice water bath, and filtered to separate the desired 7-chloro-3-(chloromethyl)-1,2,3-benzotriazin-4(3H)-one product. The separated product was washed with a small amount of cold water and dried in an oven at about 60° C. The product so obtained was a crystalline solid substance, M.P., 117–20° C.

EXAMPLES 55–70

Other representative (halomethyl)benzotriazinone compounds, prepared from halogenating agent and the corresponding (hydroxymethyl)benzotriazinone compound in accordance with the procedures of the foregoing teachings and examples, are the following:

5-chloro-3-(chloromethyl)-1,2,3-benzotriazin-4(3H)-one, M.P. 120–2° C.;
5,8-dichloro-3-(chloromethyl)-1,2,3-benzotriazin-4(3H)-one, M.P. 147–50° C. (dec.);
6-bromo-3-(chloromethyl)-1,2,3-benzotriazin-4(3H)-one, M.P. 128–31° C.;
6,7-dichloro-3-(bromomethyl)-1,2,3-benzotriazin-4(3H)-one, M.W., 343.4;
5,6,7-trichloro-3-(chloromethyl)-1,2,3-benzotriazin-4(3H)-one, M.P. 122–6° C.;
8-chloro-3-(chloromethyl)-1,2,3-benzotriazin-4(3H)-one, M.P. 120–2° C.;
5,7-dichloro-3-(chloromethyl)-1,2,3-benzotriazin-4(3H)-one, M.P. 130–3° C.;
7-chloro-3-(bromomethyl)-1,2,3-benzotriazin-4(3H)-one, M.W., 274.5;
5,6,8-trichloro-3-(chloromethyl)-1,2,3-benzotriazin-4(3H)-one, M.P. 145–8° C. (dec.);
6-chloro-3-(chloromethyl)-1,2,3-benzotriazin-4(3H)-one, M.P. 120–2° C.;
6,8-dibromo-3-(chloromethyl)-1,2,3-benzotriazin-4(3H)-one, M.P. 170–2° C. (dec.);
6,8-dichloro-3-(chloromethyl)-1,2,3-benzotriazin-4(3H)-one, M.P. 130–2° C.;
6,8-dibromo-3-(iodomethyl)-1,2,3-benzotriazin-4(3H)-one, M.W., 444.9;
6,7,8-trichloro-3-(chloromethyl)-1,2,3-benzotriazin-4(3H)-one, M.P. 154–6° C.;
7,8-dichloro-3-(chloromethyl)-1,2,3-benzotriazin-4(3H)-one, M.P. 148–50° C.;
5,6,7,8-tetrachloro-3-(chloromethyl)-1,2,3-benzotriazin-4(3H)-one, M.P. 164–7° C.;
6-bromo-8-chloro-3-(chloromethyl)-1,2,3-benzotriazin-4(3H)-one, M.W. 309;
6,7,8-tribromo-3-(chloromethyl)-1,2,3-benzotriazin-4(3H)-one, M.W. 432.3;
7-chloro-3-(iodomethyl)-1,2,3-benzotriazin-4(3H)-one, M.W. 321.5; and
5,6-dichloro-3-(chloromethyl)-1,2,3-benzotriazin-4(3H)-one, M.P. 100–5° C.

The (hydroxymethyl)benzotriazinone compounds which are used in the preparation of the corresponding (halomethyl)benzotriazinone starting materials, and which are of the following structural formula:

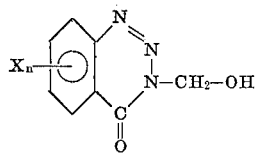

are prepared by a two-step reaction. This reaction comprises diazotization of an anthranilamide to obtain a 1,2,3-benzotriazin-4(3H)-one which is then treated with formaldehyde to obtain the desired (hydroxymethyl)-benzotriazinone compounds:

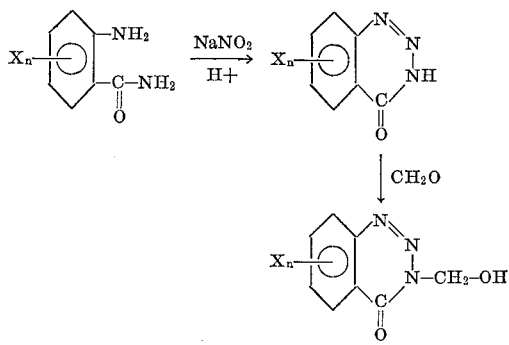

The diazotization and the treatment with formaldehyde are carried out in standard procedures.

I claim:
1. Method which comprises contacting an arthropod with an inactivating amount of an active compound of the formula

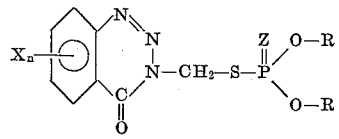

wherein Z represents oxygen or sulfur; each X independently represents bromo or chloro; each R independently represents lower alkyl; and n represents an integer of from 1 to 4, both inclusive.

2. Method of claim 1 wherein the contacting is carried out by applying the active compound to a habitat of the arthropod.

3. Method of claim 1 wherein the active compound is S-((7-chloro-4-oxo-1,2,3-benzotriazin-3(4H)-yl)-methyl) O,O-dimethyl phosphorodithioate.

4. Method of claim 1 wherein the active compound is S-((7-chloro-4-oxo-1,2,3-benzotriazin-3(4H)-yl)-methyl) O,O-diethyl phosphorodithioate.

5. Method of claim 1 wherein the active compound is S-((6-chloro-4-oxo-1,2,3-benzotriazin-3(4H)-yl)-methyl) O,O-dimethyl phosphorodithioate.

6. Method of claim 1 wherein the active compound is S-((6-chloro-4-oxo-1,2,3-benzotriazin-3(4H)-yl)-methyl) O,O-diethyl phosphorodithioate.

7. Method of claim 1 wherein the active compound is S-((6,8-dichloro-4-oxo-1,2,3-benzotriazin-3(4H)-yl)-methyl) O,O-dimethyl phosphorodithioate.

8. Method of claim 1 wherein the active compound is S-((6,8-dichloro-4-oxo-1,2,3-benzotriazin-3(4H)-yl) methyl) O,O-diethyl phosphorodithioate.

9. Composition comprising a surface-active agent and an active compound of the formula

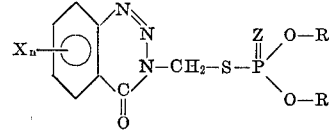

wherein Z represents oxygen or sulfur; each X independently represents bromo or chloro; each R independently represents loweralkyl; and n represents an integer of from 1 to 4, both inclusive.

10. Composition of claim 9 wherein the active compound is S-((7-chloro-4-oxo-1,2,3-benzotriazin-3(4H)-yl) methyl) O,O-dimethyl phosphorodithioate.

11. Composition of claim 9 wherein the active compound is S-((7-chloro-4-oxo-1,2,3-benzotriazin-3(4H)-yl) methyl) O,O-diethyl phosphorodithioate.

12. Composition of claim 9 wherein the active compound is S-((6-chloro-4-oxo-1,2,3-benzotriazin-3(4H)-yl) methyl) O,O-dimethyl phosphorodithioate.

13. Composition of claim 9 wherein the active compound is S-((6-chloro-4-oxo-1,2,3-benzotriazin-3(4H)-yl)methyl) O,O-diethyl phosphorodithioate.

14. Composition of claim 9 wherein the active compound is S-((6,8-dichloro-4-oxo-1,2,3-benzotriazin-3(4H)-yl)methyl) O,O-dimethyl phosphorodithioate.

15. Composition of claim 9 wherein the active compound is S-((6,8-dichloro-4-oxo-1,2,3-benzotriazin-3(4H)-yl)methyl) O,O-diethyl phosphorodithioate.

16. Composition comprising a finely divided carrier solid and an active compound of the formula

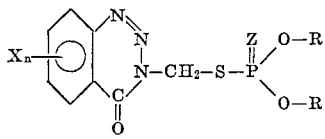

wherein Z represents oxygen or sulfur; each X independently represents bromo or chloro; each R independently represents loweralkyl; and $n$ represents an integer of from 1 to 4, both inclusive.

17. Composition of claim 16 wherein the active compound is S-((7-chloro-4-oxo-1,2,3-benzotriazin-3(4H)-yl)methyl) O,O-dimethyl phosphorodithioate.

18. Composition of claim 16 wherein the active compound is S-((7-chloro-4-oxo-1,2,3-benzotriazin-3(4H)-yl)methyl) O,O-diethyl phosphorodithioate.

19. Composition of claim 16 wherein the active compound is S-((6-chloro-4-oxo-1,2,3-benzotriazin-3(4H)-yl)methyl) O,O-dimethyl phosphorodithioate.

20. Composition of claim 16 wherein the active compound is S-((6-chloro-4-oxo-1,2,3-benzotriazin-3(4H)-yl)methyl) O,O-diethyl phosphorodithioate.

21. Composition of claim 16 wherein the active compound is S-((6,8-dichloro-4-oxo-1,2,3-benzotriazin-3(4H)-yl)methyl) O,O-dimethyl phosphorodithioate.

22. Composition of claim 16 wherein the active compound is S-((6,8-dichloro-4-oxo-1,2,3-benzotriazin-3(4H)-yl)methyl) O,O-diethyl phosphorodithioate.

References Cited

UNITED STATES PATENTS

| | | | |
|---|---|---|---|
| 2,758,115 | 8/1956 | Lorenz | 260—248 |
| 3,163,646 | 12/1964 | Herlinger et al. | 260—248X |
| 3,294,631 | 12/1966 | Lorenz et al. | 260—248X |
| 3,316,262 | 4/1967 | Hasspacher et al. | 260—248 |
| 3,502,670 | 3/1970 | Rigterink | 260—248 |

SHEP K. ROSE, Primary Examiner

U.S. Cl. X.R.

260—248